United States Patent
Lee et al.

(10) Patent No.: US 12,494,491 B2
(45) Date of Patent: Dec. 9, 2025

(54) METHOD OF PREPARING LITHIUM METAL ELECTRODE AND LITHIUM METAL SECONDARY BATTERY

(71) Applicant: LG ENERGY SOLUTION, LTD., Seoul (KR)

(72) Inventors: Keon Je Lee, Daejeon (KR); Soo Hyun Kim, Daejeon (KR); Ki Hyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 776 days.

(21) Appl. No.: 17/772,001

(22) PCT Filed: Jun. 15, 2021

(86) PCT No.: PCT/KR2021/007469
§ 371 (c)(1),
(2) Date: Apr. 26, 2022

(87) PCT Pub. No.: WO2021/256829
PCT Pub. Date: Dec. 23, 2021

(65) Prior Publication Data
US 2023/0006211 A1    Jan. 5, 2023

(30) Foreign Application Priority Data
Jun. 15, 2020    (KR) .................. 10-2020-0072106

(51) Int. Cl.
*H01M 4/1395*    (2010.01)
*H01M 4/04*    (2006.01)
(Continued)

(52) U.S. Cl.
CPC ......... *H01M 4/628* (2013.01); *H01M 4/0435* (2013.01); *H01M 4/134* (2013.01);
(Continued)

(58) Field of Classification Search
None
See application file for complete search history.

(56) References Cited

U.S. PATENT DOCUMENTS

| | | | |
|---|---|---|---|
| 5,528,920 A | 6/1996 | Bouchard et al. | |
| 2002/0182488 A1* | 12/2002 | Cho | H01M 10/052 429/231.95 |

(Continued)

FOREIGN PATENT DOCUMENTS

| | | |
|---|---|---|
| CN | 1389940 A | 1/2003 |
| CN | 104993094 A | 10/2015 |

(Continued)

OTHER PUBLICATIONS

International Search Report (PCT/ISA/210) issued in PCT/KR2021/007469, dated Sep. 24, 2021.
(Continued)

*Primary Examiner* — Jeffrey T Barton
(74) *Attorney, Agent, or Firm* — Birch, Stewart, Kolasch & Birch, LLP

(57) ABSTRACT

A method of preparing a lithium metal electrode, wherein the method includes providing a lithium metal strip, and providing a lubricant composition including a fluorine-based solvent and a fluorine-based compound on the lithium metal strip to obtain a coated lithium metal strip; and rolling the coated lithium metal strip to obtain the lithium metal electrode.

10 Claims, 2 Drawing Sheets

(51) Int. Cl.

| | | |
|---|---|---|
| *H01M 4/134* | (2010.01) | |
| *H01M 4/36* | (2006.01) | |
| *H01M 4/38* | (2006.01) | |
| *H01M 4/62* | (2006.01) | |
| *H01M 10/052* | (2010.01) | |
| *H01M 4/02* | (2006.01) | |
| *H01M 4/583* | (2010.01) | |

(52) U.S. Cl.
CPC ......... *H01M 4/1395* (2013.01); *H01M 4/366* (2013.01); *H01M 4/382* (2013.01); *H01M 10/052* (2013.01); *H01M 2004/021* (2013.01); *H01M 2004/027* (2013.01); *H01M 2004/028* (2013.01); *H01M 4/364* (2013.01); *H01M 4/583* (2013.01)

(56) References Cited

U.S. PATENT DOCUMENTS

| | | |
|---|---|---|
| 2008/0032904 A1 | 2/2008 | Watanabe et al. |
| 2010/0246066 A1 | 9/2010 | Kasamatsu et al. |
| 2017/0179491 A1 | 6/2017 | Zaghib et al. |
| 2018/0301693 A1 | 10/2018 | Choi et al. |
| 2019/0048281 A1 | 2/2019 | Zaghib et al. |
| 2019/0140257 A1 | 5/2019 | Chae et al. |
| 2019/0140266 A1 | 5/2019 | Yun |
| 2019/0319272 A1 | 10/2019 | Kim et al. |
| 2019/0341614 A1* | 11/2019 | Drews .................. H01M 4/134 |
| 2020/0291323 A1 | 9/2020 | Zaghib et al. |
| 2024/0372096 A1* | 11/2024 | Lee ...................... H01M 4/133 |

FOREIGN PATENT DOCUMENTS

| | | |
|---|---|---|
| CN | 108475774 A | 8/2018 |
| CN | 109244369 A | 1/2019 |
| CN | 110071284 A | 7/2019 |
| EP | 0 692 831 A1 | 1/1996 |
| FR | 1537922 A * | 8/1968 |
| JP | 7-299504 A | 11/1995 |
| JP | 10-58007 A | 3/1998 |
| JP | 2997537 B2 | 10/1999 |
| JP | 3229910 B2 | 9/2001 |
| JP | 2003-36842 A | 2/2003 |
| JP | 2006-77052 A | 3/2006 |
| JP | 2018-126780 A | 6/2018 |
| JP | 2019-46596 A | 3/2019 |
| KR | 10-2002-0091746 A | 12/2002 |
| KR | 10-0413796 B1 | 1/2004 |
| KR | 10-2014-0125970 A | 10/2014 |
| KR | 10-2016-0142360 A | 12/2016 |
| KR | 10-2018-0041086 A | 4/2018 |
| KR | 10-2018-0082963 A | 6/2018 |
| KR | 10-2018-0077147 A | 7/2018 |
| KR | 10-2018-0120370 A | 11/2018 |
| KR | 10-2019-0033922 A | 4/2019 |
| KR | 10-2042108 B1 | 11/2019 |
| WO | WO9003357 A1 * | 4/1990 |
| WO | WO 2006/030632 A1 | 3/2006 |
| WO | WO 2007/086384 A1 | 8/2007 |
| WO | WO 2009/069230 A1 | 8/2009 |

OTHER PUBLICATIONS

Extended European Search Report for European Application No. 21826183.2, dated Jul. 22, 2024.

* cited by examiner

[FIG. 1]
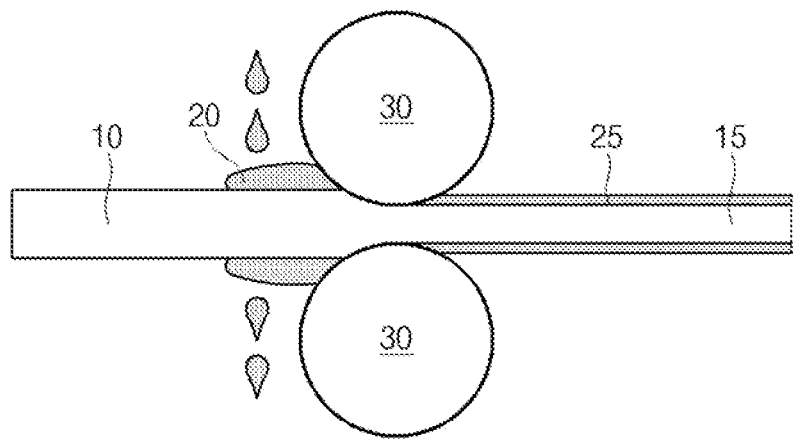
[FIG. 2]
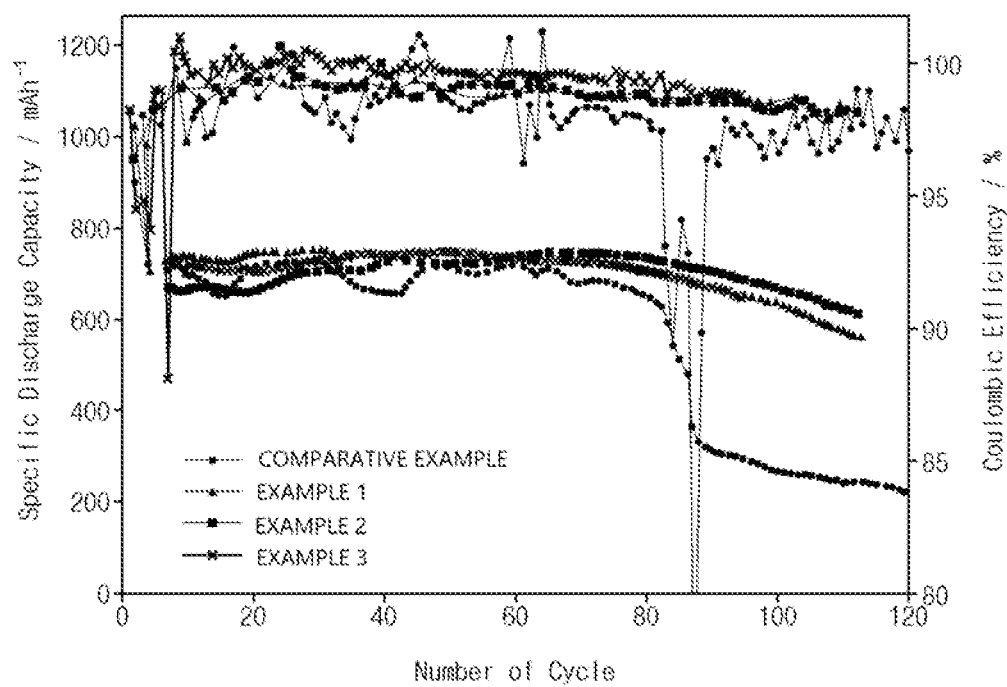

[FIG. 3]
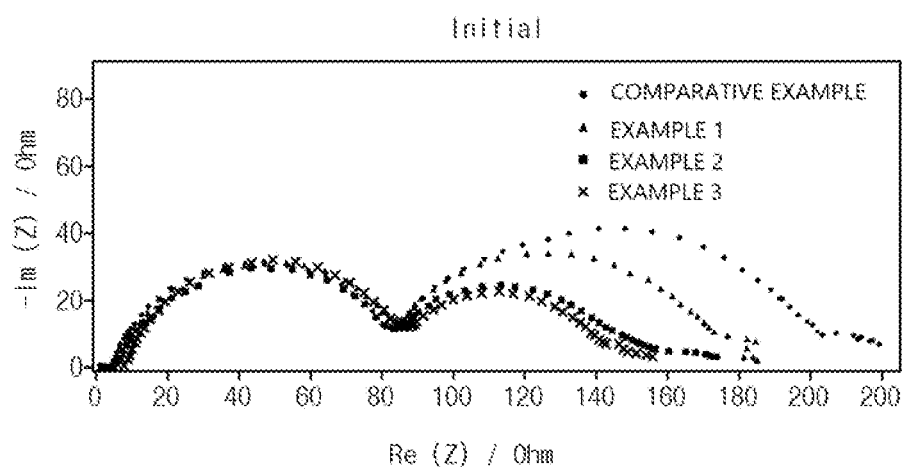
[FIG. 4]
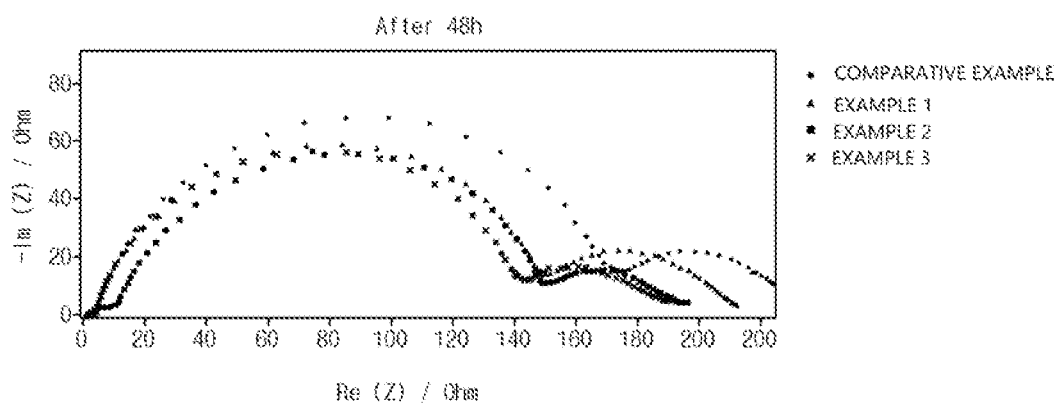

METHOD OF PREPARING LITHIUM METAL ELECTRODE AND LITHIUM METAL SECONDARY BATTERY

TECHNICAL FIELD

This application claims priority from Korean Patent Application No. 10-2020-0072106, filed on Jun. 15, 2020, the disclosure of which is incorporated by reference herein.

The present invention relates to a method of preparing a lithium metal electrode and a lithium metal secondary battery which includes the electrode prepared by the above preparation method.

BACKGROUND ART

A lithium secondary battery is typically composed of a positive electrode, a negative electrode, a separator disposed therebetween, and an electrolyte. Recently, development of a lithium metal secondary battery using lithium metal itself, an active material, as a negative electrode capable of obtaining high energy density has been made as the demand for a high-capacity secondary battery increases.

The lithium metal secondary battery is a secondary battery using lithium metal or a lithium alloy as a negative electrode, wherein the lithium metal secondary battery, for example, includes a lithium-metal oxide battery, a lithium-sulfur battery, or a lithium-air battery. With respect to the lithium metal, since density is low at 0.54 g/cm$^3$ and a standard reduction potential is also very low at −3.045 V (SHE: based on a standard hydrogen electrode), it has received the most attention as an electrode material for a high energy density battery.

However, unlike a conventional lithium ion secondary battery, the lithium metal secondary battery is charged while the lithium metal of the negative electrode is plated, and is discharged while the lithium metal is stripped, wherein lithium dendrite growth occurs during charge, and, as a result, since a short circuit in the battery may occur and a surface area of the electrode is increased to also increase a side reaction with an electrolyte solution, life characteristics and stability of the battery may be rapidly degraded. Thus, in order to commercialize a lithium metal electrode, there is a need to develop a technique for stabilizing the lithium metal electrode and suppressing dendrites.

The lithium metal electrode is generally prepared by rolling a lithium metal strip with a rolling roll. The rolling rolls are mostly prepared from a metallic material to ensure rigidity and durability, wherein lithium metal has a property of strongly adhering to most metals only by simple contact. Thus, it is essential to use a lubricant to prevent adhesion between the rolling roll and lithium during the preparation of the lithium metal electrode.

Japanese Patent Application Laid-open Publication No. 1998-058007 (Patent Document 1) discloses a method of preparing a lithium metal foil by using a chain saturated hydrocarbon having 8 or more carbon atoms as a lubricant. However, the chain saturated hydrocarbon lubricant having 8 or more carbon atoms has a problem in that handling is difficult due to its high flammability and it is very harmful to the human body.

Also, Korean Patent Application Laid-open Publication No. 10-2016-0142350 (Patent Document 2) discloses a method of preparing a lithium metal film by using a lubricant composition including a polymer having a specific structure. However, the lubricant composition also has a problem in that an aromatic or hydrocarbon having very high flammability and harmfulness to the human body is used as a solvent. Furthermore, in a case in which the lubricant composition of Patent Document 2 is used, a passivation layer including $Li_2CO_3$, $Li_2O$, and LiOH is formed on a surface of the lithium metal film, wherein there is a limitation in that the above components form dendrites and dead lithium (Li) by continuously reacting with an electrolyte solution through breakage due to non-uniform plating/stripping of lithium during continuous charge and discharge and the resulting volume change.

DISCLOSURE OF THE INVENTION

Technical Problem

An aspect of the present invention provides a method of preparing a lithium metal electrode which is not harmful to the human body and the environment and may effectively suppress dendrite formation due to a reaction with an electrolyte solution by forming a stable protective layer on a surface of the lithium metal electrode.

Another aspect of the present invention provides a lithium metal secondary battery in which resistance characteristics and life characteristics are excellent by including the lithium metal electrode prepared by the above-described method.

Technical Solution

According to an aspect of the present invention, there is provided a method of preparing a lithium metal electrode which includes the steps of: providing a lithium metal strip; and providing a lubricant composition including a fluorine-based solvent and a fluorine-based compound on the lithium metal strip to obtain a coated lithium metal strip, and rolling the coated lithium metal strip to obtain the lithium metal electrode.

In this case, the fluorine-based solvent may have a boiling point of 150° C. or less, preferably 50° C. to 130° C., and more preferably 80° C. to 120° C., and may have a vapor pressure of 0.1 kPa to 30 kPa, preferably 1 kPa to 20 kPa, and more preferably 2 kPa to 10 kPa.

Specifically, the fluorine-based solvent may be a compound represented by [Formula 1].

$CF_3—O—[CF(CF_3)—CF_2O]_x—[CF_2O]_y—CF_3$     [Formula 1]

In Formula 1, x and y are each independently an integer of 1 to 20.

The fluorine-based compound may be an oligomer or polymer having a weight-average molecular weight of 100 g/mol to 100,000 g/mol, for example, 2,000 g/mol to 20,000 g/mol, and, specifically, may be an oligomer or polymer including a unit represented by [Formula 2].

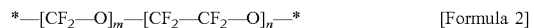

*—$[CF_2—O]_m—[CF_2—CF_2—O]_n$—*     [Formula 2]

In Formula 2, m and n are each independently an integer of 1 to 100.

The lubricant composition may include 90 wt % to 99 wt % of the fluorine-based solvent and 1 wt % to 10 wt % of the fluorine-based compound.

Also, the lubricant composition may have a viscosity of 0.5 cp to 100 cp.

According to another aspect of the present invention, there is provided a lithium metal electrode which is prepared by the above-described method, and wherein the lithium metal electrode after rolling includes a lithium metal thin film; and a protective layer on the lithium metal thin film, wherein the protective layer contains LiF.

In this case, the LiF may be formed by a reaction between a lithium metal and a fluorine atom in the lubricant composition during a rolling process. Also, the protective layer may include the LiF in an amount of 0.1 wt % to 10 wt %, and may have a thickness of 0.1 μm to 10 μm.

According to another aspect of the present invention, there is provided a lithium metal battery including a positive electrode, a negative electrode, and an electrolyte, wherein the lithium metal battery includes the above-described lithium metal electrode of the present invention as the negative electrode.

Advantageous Effects

According to a method of preparing a lithium metal electrode of the present invention, lithium and fluorine contained in a lubricant react during rolling to form a protective layer containing LiF on a surface of the lithium metal electrode. In a case in which the protective layer containing LiF is formed on the surface of the lithium metal electrode, an increase in resistance and a decrease in life characteristics due to a side reaction between lithium metal and an electrolyte solution may be effectively suppressed.

Also, a fluorine-based solvent and a fluorine-based compound, which are used in the present invention, have excellent process stability due to low flammability and toxicity.

Furthermore, according to the method of preparing a lithium metal electrode of the present invention, since the protective layer is formed during the rolling process, a separate coating process for forming the protective layer is not required, and thus, processability and economic efficiency are excellent.

In addition, since the method of preparing a lithium metal electrode of the present invention does not require a separate process for drying by using a high volatile solvent with a boiling point of 150° C. or less and a vapor pressure of 0.1 kPa to 30 kPa as the fluorine-based solvent, processability is excellent.

Since the lithium metal electrode prepared according to the method of the present invention includes the protective layer containing LiF on its surface and the LiF, unlike components such as $LiCO_3$, $Li_2O$, and LiOH, is not easily decomposed during battery charge and discharge, a stabilization effect of the lithium metal electrode is excellent. Thus, in a case in which the lithium metal electrode prepared according to the method of the present invention is used, a lithium metal battery having excellent life characteristics may be prepared.

BRIEF DESCRIPTION OF THE DRAWINGS

FIG. 1 is a view for explaining a method of preparing a lithium metal electrode according to the present invention;

FIG. 2 is a graph illustrating the results of measuring life characteristics according to Experimental Example 1;

FIG. 3 is a view illustrating the results of evaluating initial resistance characteristics according to Experimental Example 2; and FIG. 4 is a view illustrating the results of evaluating initial resistance characteristics after 48 hours according to Experimental Example 2.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Method of Preparing Lithium Metal Electrode

First, a method of preparing a lithium metal electrode according to the present invention will be described.

The method of preparing a lithium metal electrode according to the present invention is illustrated in FIG. 1.

As illustrated in FIG. 1, the method of preparing a lithium metal electrode of the present invention includes the steps of: (1) providing a lithium metal strip 10; and (2) providing a lubricant composition 20 including a fluorine-based solvent and a fluorine-based compound on the lithium metal strip 10 and rolling the lithium metal strip 10.

The lithium metal strip 10 is a raw material for preparing a lithium metal electrode, wherein it is a long band-shaped lithium metal prepared by extruding a lithium ingot or rod. The lithium metal strip 10 is provided to a rolling mill including rolling rollers 30 and passed between the rolling rollers 30 to reduce a thickness of the lithium metal strip to form a lithium metal thin film 15.

The lubricant composition 20 is provided on the lithium metal strip 10 before the lithium metal strip 10 is passed between the rolling rollers 30. In this case, the lubricant composition 20, as illustrated in FIG. 1, may be directly applied on the lithium metal strip 10, or, although not shown, the lubricant composition may be applied to a surface of the rolling roller so that the lubricant composition is provided on the lithium metal strip when the rolling roller is in contact with the lithium metal strip.

In a case in which the lubricant composition 20 is directly applied on the lithium metal strip 10, an application method is not particularly limited, and various application methods known in the art, for example, methods, such as spray, bar coating, or dip coating, may be used.

If rolling is performed after the lubricant composition 20 is provided as described above, the lithium metal strip 10 is rolled to form the lithium metal thin film 15, and a thin polymer layer is formed on a surface of the lithium metal thin film 15 by the fluorine-based compound included in the lubricant composition to prevent adhesion of the lithium metal strip 10 to the rolling roller 30. Also, fluorine atoms contained in the lubricant composition react with lithium metal to form LiF by the rolling, and, as a result, a lithium metal electrode having the lithium metal thin film 15 and a protective layer 25, which is formed on the surface of the lithium metal thin film 15 and contains LiF, is prepared.

The lubricant composition used in the present invention includes a fluorine-based solvent and a fluorine-based compound.

Since the fluorine-based solvent has excellent compatibility with the fluorine-based compound to be described later, it dissolves the fluorine-based compound well so that the lubricant composition may be smoothly applied on the lithium metal strip.

It is desirable that the fluorine-based solvent is a solvent with a boiling point of 150° C. or less, preferably 50° C. to 130° C., and more preferably 80° C. to 120° C.

Also, it is desirable that the fluorine-based solvent is a solvent with a vapor pressure of 0.1 kPa to 30 kPa, preferably 1 kPa to 20 kPa, and more preferably 2 kPa to 10 kPa.

In a case in which the boiling point and the vapor pressure of the fluorine-based solvent satisfy the above ranges, since the fluorine-based solvent is easily volatilized at room temperature, there is an advantage in that it does not need to go through a separate drying process for removing the solvent. Specifically, the fluorine-based solvent may be a compound represented by [Formula 1].

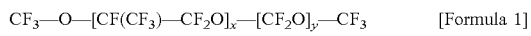

$CF_3-O-[CF(CF_3)-CF_2O]_x-[CF_2O]_y-CF_3$     [Formula 1]

In Formula 1, x and y may each independently be an integer of 1 to 20, preferably an integer of 1 to 8, and more preferably an integer of 1 to 4.

Next, the fluorine-based compound is to prevent adhesion between the rolling roller and the lithium metal strip by forming a thin polymer layer on the surface of the lithium metal strip.

In the present invention, the fluorine-based compound includes a fluorine atom, and may be an oligomer or polymer having a weight-average molecular weight (Mw) of 100 g/mol to 100,000 g/mol, preferably 2,000 g/mol to 20,000 g/mol, and more preferably 5,000 g/mol to 10,000 g/mol. If the weight-average molecular weight of the fluorine-based compound is excessively small, since the polymer layer is not smoothly formed on the lithium metal strip, lubrication performance is poor, and, if the weight-average molecular weight is excessively large, since viscosity of the lubricant composition may be increased, spraying or application on the lithium metal strip may not be performed smoothly.

More specifically, the fluorine-based compound may be an oligomer or polymer including a unit represented by the following [Formula 2].

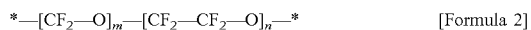

$*-[CF_2-O]_m-[CF_2-CF_2-O]_n-*$     [Formula 2]

In Formula 2, m to n may each independently be an integer of 1 to 100, preferably an integer of 20 to 80, and more preferably an integer of 40 to 60.

The lubricant composition may include the fluorine-based solvent in an amount of 90 wt % to 99 wt %, preferably 95 wt % to 99 wt %, and more preferably 96 wt % to 98 wt %.

Also, the lubricant composition may include the fluorine-based compound in an amount of 1 wt % to 10 wt %, preferably 1 wt % to 5 wt %, and more preferably 2 wt % to 4 wt %.

If the amount of the fluorine-based compound in the lubricant composition is excessively low, since the polymer layer is not smoothly formed on the lithium metal strip, the lubrication performance is poor, and, if the amount is excessively large, since the fluorine-based compound may not be dissolved in the fluorine-based solvent or the viscosity of the lubricant composition may be increased, the spraying or application on the lithium metal strip may not be performed smoothly.

Furthermore, the lubricant composition may have a viscosity measured at 20° C. of 0.5 cp to 100 cp, preferably 1 cp to 20 cp, and more preferably 1 cp to 5 cp. In a case in which the viscosity of the lubricant composition satisfies the above range, the lubricant composition is smoothly sprayed and has excellent lubrication performance.

The lithium metal electrode of the present invention prepared by the above-described method includes a lithium metal thin film and a protective layer which is formed on the surface of the lithium metal thin film and contains LiF. Since the LiF, unlike components such as $LiCO_3$, $Li_2O$, and LiOH, is not easily decomposed during battery charge and discharge, it may effectively prevent contact between the lithium metal electrode and an electrolyte solution by stably coating the surface of the lithium metal electrode even during repeated charge and discharge, and accordingly, formation of lithium dendrites due to a side reaction with the electrolyte solution may be effectively suppressed. Thus, if the lithium metal electrode prepared according to the method of the present invention is used, life characteristics of a lithium metal battery may be improved.

Lithium Metal Battery

Next, a lithium metal battery according to the present invention will be described.

The lithium metal battery according to the present invention includes the lithium metal electrode prepared according to the above method. Specifically, the lithium metal battery according to the present invention includes a positive electrode, a negative electrode, and an electrolyte, and may include a lithium metal thin film and a protective layer, which is formed on a surface of the lithium metal thin film and contains LiF, as the negative electrode. Also, the lithium metal battery according to the present invention, if necessary, may further include a separator.

The lithium metal battery of the present invention, for example, may be a lithium-sulfur battery. Preferably, the lithium metal battery of the present invention may be a lithium-sulfur battery capable of achieving high capacity characteristics.

Hereinafter, each component of the lithium metal battery of the present invention will be described in more detail.

Negative Electrode

The negative electrode is a lithium metal electrode prepared according to the method of the present invention, wherein it includes a lithium metal thin film and a protective layer formed on the surface of the lithium metal thin film.

The protective layer contains a LiF component which is formed by a reaction between a lithium metal and a fluorine atom in the lubricant composition during a rolling process. The protective layer containing LiF is not decomposed even during repeated charge and discharge and stably coats the surface of the lithium metal electrode so that contact between the lithium metal electrode and the electrolyte solution may be effectively prevented.

The protective layer may include the LiF in an amount of 0.1 wt % to 10 wt %, preferably 0.5 wt % to 5 wt %, and more preferably 1 wt % to 2 wt % based on a total weight of the protective layer. In a case in which the amount of the LiF in the protective film satisfies the above range, the side reaction with the electrolyte solution may be effectively blocked while ensuring lithium ion conductivity.

The protective layer may have a thickness of 0.1 μm to 10 μm, preferably 0.5 μm to 5 μm, and more preferably 1 μm to 3 μm. When the thickness of the protective layer satisfies the above range, the side reaction with the electrolyte solution may be effectively blocked while ensuring the lithium ion conductivity.

Positive Electrode

Various positive electrodes used in a lithium metal battery may be used as the positive electrode. For example, the positive electrode may have a form in which a positive electrode active material layer is stacked on a positive electrode collector.

As a positive electrode active material, general positive electrode active materials used in a lithium metal battery may be used, for example, a sulfur-containing compound may be used.

As the sulfur-containing compound, for example, at least one selected from $Li_2S_n$ (n=1); a disulfide compound, such as 2,5-dimercapto-1,3,4-thiadiazole and 1,3,5-trithiocyanuric acid; an organic sulfur compound; and a carbon-sulfur composite may be used.

A conductive agent or a binder may be further included in the positive electrode active material layer, if necessary.

The conductive agent not only provides electron conductivity by acting as a path for electrons to move from the current collector to the positive electrode active material, but also simultaneously acts as a path for lithium ions ($Li^+$) dissolved in the electrolyte to move to sulfur and react by electrically connecting the electrolyte and the positive electrode active material.

The conductive agent is not particularly limited so long as it has conductivity without causing adverse chemical changes in the battery, and, for example, a conductive material, such as: graphite; carbon black such as Denka black, acetylene black, Ketjen black, channel black, furnace black, lamp black, and thermal black; conductive fibers such as carbon fibers or metal fibers; fluorocarbon powder, metal powder such as aluminum powder, and nickel powder; conductive whiskers such as zinc oxide whiskers and potassium titanate whiskers; conductive metal oxide such as titanium oxide; or polyphenylene derivatives, may be used. As a specific example of a commercial conductive agent, acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon) may be used.

The binder is a component that assists in the binding between the active material and the conductive agent and in the binding with the current collector, wherein the binder applicable to the present invention may be all binders known in the art, and, specifically, the binder may be at least one selected from the group consisting of a fluorine resin-based binder including polyvinylidene fluoride (PVDF) or polytetrafluoroethylene (PTFE); a rubber-based binder including a styrene butadiene rubber, an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder; a polyolefin-based binder including polyethylene or polypropylene; a polyimide-based binder; a polyester-based binder; and a silane-based binder, or a mixture or copolymer of two or more thereof, but is not limited thereto.

Electrolyte

As the electrolyte, a liquid electrolyte, an organic solid electrolyte, and an inorganic solid electrolyte, which are used in a secondary battery, may be used, and a type thereof is not particularly limited.

For example, the liquid electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra—CN (where Ra is a linear, branched, or cyclic hydrocarbon group having 2 to 20 carbon atoms and may include a double-bond aromatic ring or ether bond); amides such as dimethylformamide; dioxolanes such as 1,3-dioxolane; or sulfolanes may be used as the organic solvent.

The lithium salt may be used without particular limitation as long as it is a compound capable of providing lithium ions used in the lithium secondary battery.

Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. If the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate; pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above electrolyte components. In this case, the additive may be included in an amount of 0.1 wt % to 10 wt % based on a total weight of the electrolyte.

As the organic solid electrolyte, for example, a polyethylene derivative, a polyethylene oxide derivative, a polypropylene oxide derivative, a phosphoric acid ester polymer, polyalginate lysine, polyester sulfide, polyvinyl alcohol, polyvinylidene fluoride, and a polymer containing an ionic dissociation group may be used.

As the inorganic solid electrolyte, for example, a nitride, halide, or sulfate of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, may be used.

Separator

The separator separates the negative electrode and the positive electrode and provides a movement path of lithium ions, wherein any separator may be used as the separator without particular limitation as long as it is typically used as a separator in a secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used.

Also, a typical porous nonwoven fabric, for example, a nonwoven fabric formed of high melting point glass fibers or polyethylene terephthalate fibers may be used.

Furthermore, a coated separator including a ceramic component or a polymer material may be used to secure heat resistance or mechanical strength, and the separator having a single layer or multilayer structure may be optionally used.

The lithium metal battery as described above may be suitably used in portable devices, such as mobile phones, notebook computers, and digital cameras, and electric cars such as hybrid electric vehicles (HEVs).

Also, the lithium metal battery according to the present invention may be used as a unit cell of a battery module, and the battery module may be used in a battery pack. The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

A lubricant composition was prepared by mixing a fluorine-based solvent $CF_3$—O—$[CF(CF_3)$—$CF_2O]_2$—$CF_2O$—$CF_3$ (boiling point 105° C., vapor pressure: 2.5 kPa) and a fluorine-based compound Fomblin® Z15 (manufacturer: Solvay, weight-average molecular weight 8,000 g/mol) in a weight ratio of 97.6:2.4. Viscosity of the prepared lubricant composition was measured at 20° C. using a viscometer (model name: DV2TLV) of Brookfield, and the measured viscosity was 1.2 cp.

A 60 μm thick lithium metal strip was provided to a rolling mill, and, after the lubricant composition was applied on the lithium metal strip, the lithium metal strip was rolled with a rolling roller to prepare a 45 μm thick lithium metal electrode.

Example 2

A lubricant composition was prepared by mixing a fluorine-based solvent $CF_3$—O—$[CF(CF_3)$—$CF_2O]_2$—$CF_2O$—$CF_3$ (boiling point 105° C., vapor pressure: 2.5 kPa) and a fluorine-based compound Fomblin® Z15 (manufacturer: Solvay, weight-average molecular weight 8,000 g/mol) in a weight ratio of 96:4. Viscosity of the prepared lubricant composition was measured at 20° C. using a viscometer (model name: DV2TLV) of Brookfield, and the measured viscosity was 1.5 cp.

A 60 μm thick lithium metal strip was provided to a rolling mill, and, after the lubricant composition was applied on the lithium metal strip, the lithium metal strip was rolled with a rolling roller to prepare a 45 μm thick lithium metal electrode.

Example 3

A lubricant composition was prepared by mixing a fluorine-based solvent $CF_3$—O—$[CF(CF_3)$—$CF_2O]_2$—$CF_2O$—$CF_3$ (boiling point 105° C., vapor pressure: 2.5 kPa) and a fluorine-based compound Fomblin® Z25 (manufacturer: Solvay, weight-average molecular weight 9,500 g/mol) in a weight ratio of 97.6:2.4. Viscosity of the prepared lubricant composition was measured at 20° C. using a viscometer (model name: DV2TLV) of Brookfield, and the measured viscosity was 1.4 cp.

A 60 μm thick lithium metal strip was provided to a rolling mill, and, after the lubricant composition was applied on the lithium metal strip, the lithium metal strip was rolled with a rolling roller to prepare a 45 μm thick lithium metal electrode.

Comparative Example 1

A lithium metal electrode was prepared in the same manner as in Example 1 except that octane, a chain saturated hydrocarbon having 8 carbon atoms, was used as a lubricant instead of the lubricant composition of Example 1.

Experimental Example 1

<Positive Electrode Preparation>

90 parts by weight of a sulfur-carbon composite (S:C=7:3 weight ratio) as a positive electrode active material, 5 parts by weight of Denka black as a conductive agent, and 5 parts by weight of a mixture, in which a styrene-butadiene rubber and carboxymethyl cellulose were mixed in a weight ratio of 7:3, as a binder, were mixed to prepare a positive electrode slurry composition.

Then, an aluminum current collector was coated with the prepared positive electrode slurry composition, dried at 50° C. for 12 hours, and then roll pressed to prepare a positive electrode. The prepared positive electrode had a loading amount of 5.4 mAh/cm$^2$ and a porosity of 68%.

The positive electrode prepared as described above, a polyethylene separator (thickness: 20 μm, porosity 68%), and each of the lithium metal electrodes prepared in Examples 1 to 3 and Comparative Example 1 were sequentially stacked, and 0.1 ml of an electrolyte was injected to prepare a lithium-sulfur battery.

In this case, a mixed solution, in which 1 M lithium bis(trifluoromethanesulfonyl)imide (LiTFSI) and 1 wt % lithium nitrate (LiNO$_3$) were dissolved in a mixed organic solvent containing 1,3-dioxolane and dimethyl ether in a volume ratio of 1:1, was used as the electrolyte.

After the lithium-sulfur battery prepared as described above was discharged and charged three times at a current density of 0.1C at 25° C. and then discharged and charged three times at a current density of 0.2C, life characteristics of the battery were evaluated by measuring discharge capacity and coulombic efficiency while the battery was discharged at 0.5C and charged at 0.3C. Measurement results are presented in FIG. 2.

As illustrated in FIG. 2, with respect to the lithium-sulfur battery including the lithium metal electrode of Comparative Example 1, discharge capacity and coulombic efficiency were rapidly reduced after 80 cycles, but, with respect to the lithium-sulfur batteries respectively including the lithium metal electrodes of Examples 1 to 3 prepared by the method of the present invention, it may be confirmed that discharge capacities and coulombic efficiencies were excellently maintained.

Experimental Example 2

A symmetrical battery having a structure of lithium metal electrode/separator/lithium metal electrode was prepared by using each of the lithium metal electrodes prepared in Examples 1 to 3 and Comparative Example 1, and 0.1 ml of an electrolyte was injected.

In this case, a mixed solution, in which 1 M lithium bis(trifluoromethanesulfonyl)imide (LiTFSI) and 1 wt % lithium nitrate (LiNO$_3$) were dissolved in a mixed organic solvent containing 1,3-dioxolane and dimethyl ether in a volume ratio of 1:1, was used as the electrolyte.

Electrochemical Impedance Spectroscopy (EIS) was performed on each symmetrical battery prepared as described above to measure initial resistance characteristics immediately after the preparation of the battery and resistance characteristics after 48 hours. A measurement amplitude was 5 mV, and a frequency range was 0.1 Hz to 1 MHz. Initial resistance characteristics measurement results are presented in FIG. 3, and the resistance characteristics after 48 hours are presented in FIG. 4.

Referring to FIG. 3 and FIG. 4, in a case in which the lithium metal electrodes of Examples 1 to 3 prepared by the method of the present invention were included, it may be confirmed that both the initial resistance characteristics and the resistance characteristics after 48 hours were better than a case where the lithium metal electrode of Comparative Example 1 was included.

DESCRIPTION OF THE SYMBOLS

10: Lithium Metal Strip
15: Lithium Metal Thin Film
20: Lubricant Composition
25: Protective Layer
30: Rolling Roller

The invention claimed is:

1. A method of preparing a lithium metal electrode, the method comprising:
    providing a lithium metal strip;
    providing a lubricant composition comprising a fluorine-based solvent and a fluorine-based compound on the lithium metal strip to obtain a coated lithium metal strip; and
    rolling the coated lithium metal strip to obtain the lithium metal electrode.

2. The method of claim 1, wherein the fluorine-based solvent has a boiling point of 150° C. or less at a vapor pressure of 0.1 kPa to 30 kPa.

3. The method of claim 1, wherein the fluorine-based solvent has a boiling point of 50° C. to 130° C. at a vapor pressure of 1 kPa to 20 kPa.

4. The method of claim 1, wherein the fluorine-based solvent has a boiling point of 80° C. to 120° C. at a vapor pressure of 2 kPa to 10 kPa.

5. The method of claim 1, wherein the fluorine-based compound has a weight-average molecular weight of 100 g/mol to 100,000 g/mol.

6. The method of claim 1, wherein the fluorine-based compound has a weight-average molecular weight of 2,000 g/mol to 20,000 g/mol.

7. The method of claim 1, wherein the lubricant composition comprises 90 wt % to 99 wt % of the fluorine-based solvent and 1 wt % to 10 wt % of the fluorine-based compound.

8. The method of claim 1, wherein the fluorine-based solvent is a compound represented by Formula 1:

$$CF_3-O-[CF(CF_3)-CF_2O]_x-[CF_2O]_y-CF_3 \qquad \text{Formula 1}$$

wherein, in Formula 1, x and y are each independently an integer of 1 to 20.

9. The method of claim 1, wherein the fluorine-based compound comprises a unit represented by Formula 2:

$$*-[CF_2-O]_m-[CF_2-CF_2-O]_n-* \qquad \text{Formula 2}$$

wherein, in Formula 2, m to n are each independently an integer of 1 to 100.

10. The method of claim 1, wherein the lubricant composition has a viscosity of 0.5 cp to 100 cp.

* * * * *